United States Patent Office 3,561,995
Patented Feb. 9, 1971

3,561,995
METHOD OF ACTIVATING A POLYMER SURFACE AND RESULTANT ARTICLE
Sidney Hsi-Lin Wu, Berkley, and Edgar John Seyb, Jr., Oak Park, Mich., assignors to M & T Chemicals Inc., New York, N.Y., a corporation of Delaware
No Drawing. Filed Apr. 3, 1967, Ser. No. 627,864
Int. Cl. B44d 1/092
U.S. Cl. 117—47                    4 Claims

ABSTRACT OF THE DISCLOSURE

Activated polymer surfaces adaptable for the acceptance of metal deposits are prepared by contacting a clean, non-active, unconditioned polymer surface with a liquid activating composition containing at least one reactive conditioning agent selected from an acidic medium, salts of an acidic medium, a metal hydroxide, a metal oxide, and an oxygen-containing organic medium, in combination with at least one ion of a metal selected from the group consisting of platinum, palladium, silver, gold, iron, nickel, cobalt, copper, and rhodium.

---

This invention relates to the plating of polymeric materials. More particularly, it relates to the preparation of polymeric surfaces for metal plating, to compositions useful for this purpose, to methods of metal plating polymeric surfaces using these compositions, and to novel metal plated articles.

It is known that various non-metallic articles may be plated with suitable metals using techniques which involve several separate treating baths. However, these methods are inefficient due to the lengthy and numerous process steps involved. Furthermore, the useful life of each bath employed in such plating operations is variable and the process sequence must be interrupted each time a fresh bath is required.

It is an object of this invention to provide novel compositions of matter useful in processes for plating surfaces of polymeric materials. Another object of the invention is to provide novel processes useful for plating surfaces of polymeric materials. An additional object of the invention is to produce an article with an activated plastic surface. A further object of the invention is to provide a modified polymer surface which is readily adaptable for the acceptance of metal deposits. Other objects will be apparent from the following detailed description of the invention.

In accordance with certain of its aspects, the process of preparing an activated polymer surface according to the present invention comprises contacting a clean non-active unconditioned polymer surface with a liquid activating composition containing at least one reactive conditioning agent in combination with at least one ion of a metal selected from the group consisting of platinum, palladium, silver, gold, iron, nickel, cobalt, copper, and rhodium.

The polymeric surfaces which may be treated in the practice of this invention may include vinyl type polymers, characterized by polymers and copolymers of vinyl chloride, vinylidene chloride, styrene, etc.; acrylonitrile-butadiene-styrene (ABS) polymers and copolymers; acrylic type polymers characterized by polymers and copolymers of ethyl acrylate, butyl acrylate, acrylonitrile, methyl methacrylate, acrylamide, etc.; polyolefin and/or related polymers, characterized by polymers and copolymers of ethylene, propylene, isoprene, butadiene, etc.; condensation polymers, such as polyesters characterized by polyethylene terephthalate, polyethers characterized by poly(propylene oxide), polyamides, polycarbonates, polyurethanes, epoxy resins, polyester styrene resins, etc. The polymeric materials may be copolymers of these compositions with other ethylenically unsaturated monomers. Ethylenically unsaturated monomers are compounds which contain polymerizable carbon-to-carbon double bonds and may include acrylates such as acrylic acid, ethyl acrylate, acrylonitrile, etc.; vinyls such as styrenes, vinyl acetate, etc. maleates such as maleic acid, maleic anhydride, maleate esters, etc. Preferably, the techniques of this invention may be used to produce activated surfaces on polymeric acrylonitrile-butadiene-styrene (ABS) materials which are thereby rendered adaptable for the deposition of a coherent metal plate. As used herein, the term "activated surface" is meant to include a surface which is made suitable for subsequent electroless plating by chemical and/or physical modification of the surface, by deposition of catalytic materials on the surface, in either ionic or reduced form, or by a combination of both. When substantially all of the catalytic material is deposited on the polymer surface in reduced form, the polymer surface is generally referred to as a reduced activated polymer surface.

The polymer may be treated in the practice of this invention in the form of bodies, sheets, rods, etc., of polymer. It is also possible to treat surface layers of polymer on other basis materials or substrates such as wood, metal, etc. For example, a body of polymerized methyl methacrylate or polyvinylchloride bearing a surface layer of ABS terpolymer may be treated according to the practice of this invention.

The reactive conditioning agents which may be combined with the metal ion and used according to the invention may include an acidic medium, salts of said acidic medium, a metal hydroxide, metal oxide, and an oxygen-containing organic medium. A particularly preferred subclass of such reactive conditioning agents includes oxidizing agents which are capable of modifying the surface of the polymeric plastic.

Typical reactive conditioning agents may include acidic media such as the following:

ACIDS AND ANHYDRIDES

| | |
|---|---|
| Sulfuric acid | Tribromoacetic anhydride |
| Chromic acid | Iodoacetic acid |
| Perchloric acid | Iodoacetic anhydride |
| Phosphoric acid | Methoxyacetic acid |
| Hydrofluoric acid | Methoxyacetic anhydride |
| Hydrofluoroboric acid | Ethoxyacetic acid |
| Nitric acid | Ethoxyacetic anhydride |
| Propionic acid | Phenoxyacetic acid |
| Butyric acid | Phenoxyacetic anhydride |
| Acetic acid | 2-hydroxyethoxyacetic acid |
| Acetic anhydride | Malonic acid |
| Chloroacetic acid | Malonic anhydride |
| Chloroacetic anhydride | Succinic acid |
| Dichloroacetic acid | Succinic anhydride |
| Dichloroacetic anhydride | Glutaric acid |
| Trichloroacetic acid | Glutaric anhydride |
| Trichloroacetic anhydride | Adipic acid |
| Bromoacetic acid | Adipic anhydride |
| Bromoacetic anhydride | Pimelic acid |
| Dibromoacetic acid | Pimelic anhydride |
| Dibromoacetic anhydride | Fumaric acid |
| Tribromoacetic acid | Fumaric anhydride |

Various combinations of two or more acids may be used.

Partial substitutions of salts of the acids may be made. Suitable salts may include:

| | |
|---|---|
| Potassium phosphates | Sodium acetate |
| Potassium persulfate | Potassium acetate |
| Potassium chromate | Sodium sulfate |
| Potassium dichromate | Sodium fluoride |
| Potassium chloride | Calcium phosphate |
| Potassium fluoride | Strontium nitrate |
| Sodium nitrate | Sodium chromate, etc. |
| Potassium nitrate | |

Preferred inorganic acids include aqueous sulfuric acid, chromic acid, and phosphoric acid. The most preferred activating composition may comprise aqueous sulfuric acid in combination with chromic acid and palladium dichloride.

Typical illustrative examples of suitable metal hydroxides and the corresponding metal oxides which may be used in combination with aqueous solutions of compounds of platinum, palladium, silver, gold, iron, nickel, cobalt, copper and rhodium, include compounds of the formula $M(OH)_a$ and the corresponding oxides wherein M is a metal and $a$ is an integer of from 1 to 6 which represents the valence of the metal M. M is preferably an alkali metal including ammonium (sodium Na, potassium K, lithium Li, cesiums Cs, ammonium $NH_4$). Specific examples of such hydroxides and the corresponding oxides include:

| | |
|---|---|
| NaOH | $Na_2O$ |
| KOH | $K_2O$ |
| LiOH | $Li_2O$ |
| CsOH | $Cs_2O$ |
| $NH_4OH$ | |

Typical illustrative examples of suitable oxygen-containing organic media which may be used in combination with aqueous solutions of compounds of platinum, palladium, silver, gold, iron, nickel, cobalt, copper, and rhodium, include oxygen-containing organic media such as alcohols (including polyols), oxyalkylated alcohols, ketones, esters and ethers (including polyethers). Examples of such compounds include:

ALCOHOLS

Suitable alcohols may comprise compounds of the formula $R(OH)_n$, where R is a hydrocarbon or an oxyhydrocarbon group and $n$ is an integer 1–8 (preferably 1–3). R may contain inert substituents such as halogens (Cl, Br, F, I). In the formula $R(OH)_n$, R may be an alkyl group, and preferably is a lower alkyl group of from 1 to 4 carbon atoms. Specific examples of such alcohols include:

| | |
|---|---|
| methanol | ethylene glycol |
| ethanol | diethylene glycol |
| n-propanol | triethylene glycol |
| iso-propanol | propylene glycol |
| t-butanol | glycerin |
| s-butanol | oxyethylated glycerin |
| i-butanol | oxypropylated glycerin |
| n-butanol | |

KETONES

Other oxygen-containing organic compounds which may be employed according to the invention may include ketones of the formula:

wherein each of $R_1$ and $R_2$ are independently hydrocarbon or oxyhydrocarbon groups which may contain inert substituents. In the above formula it is to be understood that $R_1$ and $R_2$ may form cyclic groups. Typical ketones may include the compounds:

| | |
|---|---|
| acetone | cyclopentanone |
| methyl ethyl ketone | cyclohexanone |
| diethyl ketone | butanone |

ESTERS

Typical organic esters which may be used in the present invention include esters derived from the alcohols and acids supra, and may include esters of the formula:

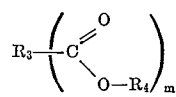

wherein each $R_3$ and $R_4$ are hydrocarbon or oxyhydrocarbon groups which may contain inert substituents, and $m$ is an integer 1–4 (preferably 1–2). Specific examples of such esters include:

| | |
|---|---|
| methyl acetate | diethyl succinate |
| ethyl acetate | diethyl adipate |
| butyl acetate | |

ETHERS AND POLYETHERS

Typical ethers include compounds of the formula: $R_5$—O—$R_6$ wherein each of $R_5$ and $R_6$ are hydrocarbon groups or oxygen-containing hydrocarbon groups. $R_5$ and $R_6$ may be linked to form heterocyclic ethers. Specific examples of such ethers include:

| | |
|---|---|
| dimethyl ether | butoxy diethyl ether |
| diethyl ether | furans |
| methyl ethyl ether | pyrans |
| dimethoxy ethyl ether | oxetanes, etc. |

In addition to the aforementioned acidic media, salts of said acidic media, metal hydroxides, metal oxides and organic media, other polymer etching solutions may be used in combination with at least one ion of a metal selected from the group consisting of platinum, palladium, silver, gold, iron, nickel, cobalt, copper and rhodium to prepare suitable activating compositions.

A particularly useful subclass of reactive conditioning agents which may be combined with ions of platinum, palladium, silver, gold, iron, nickel, cobalt, copper or rhodium may include oxidizing agents such as chromic acid, nitric acid, perchloric acid, potassium dichromate, etc.

When strong oxidizing agents are employed, the concentration of the oxidizing agents may be adjusted to prevent violent reaction with the particular polymer surface to be activated.

Typical illustrative compounds capable of providing metal ions which may be incorporated into the reactive conditioning agent may include:

| | |
|---|---|
| Palladium dichloride | Gold chloride |
| Palladium dinitrate | Gold bromide |
| Palladium disulfate | Iron chloride |
| Palladium cyanide | Iron sulfate |
| Palladium fluoride | Nickel chloride |
| Palladium iodide | Cobalt nitrate |
| Palladium oxide | Cobalt chloride |
| Chloroplatinic acid | Cobalt sulfate |
| Bromo platinic acid | Copper chloride |
| Platinum chloride | Copper carbonate |
| Silver nitrate | Copper nitrate |
| Silver acetate | Rhodium chloride |
| Silver cyanide | Rhodium nitrate |

Only an amount of metal compound sufficient to provide ions for the formation of an activated polymer surface may be required. The concentration of the reactive conditioning agent in the activating composition may be sufficient to give a control chemical reaction with the polymeric surface.

Thus, a suitable concentration of the metal ion (based upon the total weight of the solution) which may be incorporated into the reactive conditioning agent may be at least 0.05 mg./l., suitably 0.1 mg./l.–100 g./l. and preferably from about 1.0 mg./l.–10 g./l.

Preferred metal ions which may be incorporated into the reactive conditioning agent include ions of palladium, gold, silver, and platinum, the most preferred being palladium ions. Typically, preferred palladium compounds which may be combined with the reactive conditioning agent to provide the corresponding metal ions may be palladium dihalides (i.e. palladium dichloride, palladium dibromide, palladium diiodide, and palladium difluoride).

Thus, according to one preferred aspect of the invention, a polymeric surface such as e.g., polymers and copolymers of an ABS terpolymer, polyvinyl chloride, polyvinylidene chloride, polyvinyl dichloride, polychlorostyrene, polystyrene, poly(methyl methacrylate), poly (ethyl acrylate), polyethylene, polypropylene, etc. may be contacted with at least one reactive conditioning agent such as an acidic medium, salts of said acidic medium, and an oxygen-containing organic medium containing at least one ion of a metal selected from the group consisting of compounds of platinum, palladium, silver, gold, iron, nickel, cobalt, copper, and rhodium, to provide an activated polymer surface. Alternately, the polymer surface may be contacted with the metal ion selected from the group consisting of ions of the platinum, palladium, silver, gold, iron, nickel, cobalt, copper, and rhodium, in a separate step to form an activated polymer surface after the polymer has been contacted with an acidic medium, a salt of an acidic medium, or an oxygen-containing organic medium.

The activated polymer surface so obtained is particularly adaptable for subsequent electroless or chemical metal plating and may be contacted with a suitable reducing agent to produce a reduced activated polymer surface at temperatures of 10° C.–80° C. for time periods of 0.5–20 minutes, preferably at temperatures of 30° C.–70° C. for time periods of 3–10 minutes.

Typical examples of reducing agents which may be contacted with the activated polymer surface include alkali metal (or ammonium) hypophosphites (such as sodium hypophosphite), formaldehyde, hydrazine (including substituted hydrazines, such as methyl hydrazine, ethyl hydrazine, etc.), dialkylamine boranes (such as dimethylamine borane, etc.), alkali metal borohydrides (such as potassium borohydride, etc.), and trialkylamine boranes (such as trimethylamine borane, etc.).

After contact of the activated polymer surface with a reducing agent to produce a reduced activated polymer surface, a metal plate may be chemically or electrolessly deposited upon the reduced activated polymer surface by electroless methods. Electroless plating includes maintaining the surface in contact with a solution containing a metal to be electrolessly plated and a reducing agent capable of reducing the metal to be plated to its zerovalent form. Typical examples of metals which may be chemically or electrolessly deposited on the reduced activated polymer surface include copper, nickel, silver, cobalt, gold, etc.

Thus, in one embodiment of this aspect of the invention a clean panel composed of a polymeric material (e.g. ABS) may be immersed for about 5–20 minutes in an activating composition (comprising about 100 parts by weight of $CrO_3$, about 500 parts sulfuric acid, about 700 parts of water, and about 0.05 part of palladium dichloride) at 68–72° C. thereby producing an activated polymer surface on the panel. The panel may be rinsed in water and contacted with a reducing agent (e.g. about 50 parts sodium hypophosphite in 1000 parts of water) at about 60–65° C. for about 3–5 minutes. The reduced activated panel so produced may be rinsed with water and a metal such as nickel, copper, silver, gold, cobalt, etc. may be deposited by chemical reduction on the reduced activated panel. Preferably, metallic nickel or copper may be deposited on the reduced activated polymer surface of the panel. In a typical nickel deposition, the reduced activated polymer panel may be immersed for about 5–20 minutes (depending upon the thickness of nickel plate desired) in a chemical plating bath (pH approximately 4.5, temperature about 65–75° C.) containing 50 parts by weight of nickel dichloride hexahydrate ($NiCl_2 \cdot 6H_2O$), 10 parts sodium citrate dihydrate ($Na_3C_6H_5O_7 \cdot 2H_2O$), and 10 parts sodium hypophosphite monohydrate ($NaH_2PO_2 \cdot H_2O$). The nickel plated polymer surface may then be removed from the bath and rinsed.

The plated polymer surface may be subsequently electroplated (for example, with copper, nickel, tin, zinc, etc.) or may be used directly without further plating.

According to another specific embodiment of the invention, the activated polymer surface may be subjected to the action of a reducing agent in the electroless plating step so that a reduced activated polymer surface is prepared in situ during the electroless plating of the polymer surface.

The following examples (wherein all parts are by weight unless otherwise noted) are submitted for the purpose of illustration only and are not to be construed as limiting the scope of the invention in any way. In these examples the ABS plastic had the following approximate composition based upon the total amount by weight of the copolymerized ingredients: acrylonitrile 25%; butadiene 20%; styrene 55%.

Example 1

A clean panel of acrylonitrile-butadiene-styrene with dimensions of 25 x 80 x 0.3 cm. was immersed in a bath containing 500 g./l. of sulfuric acid $H_2SO_4$, 100 g./l. of chromic acid $CrO_3$, and 1 g./l. of gold trichloride $AuCl_3$, the remainder of the bath being water. The panel was immersed in the bath for 25 minutes at a temperature of about 68° C. to produce an activated panel. The activated plastic panel was then rinsed in water, placed in a reducing bath containing 15 g./l. of sodium hypophosphite monohydrate $NaH_2PO_2 \cdot H_2O$ reducing agent for 5 minutes at 65° C. to produce a reduced-activated plastic panel. The reduced-activated ABS panel was then water rinsed and placed in an electroless copper plating bath at ambient room temperature (25° C.) for approximately 10 minutes. The electroless copper bath contained the following components:

| | G./l. |
|---|---|
| Rochelle salt $KNaC_4H_4O_6 \cdot 4H_2O$ | 140 |
| Sodium carbonate $Na_2CO_3$ | 25 |
| Sodium hydroxide NaOH | 42 |
| Cupric sulfate pentahydrate $CuSO_4 \cdot 5H_2O$ | 30 |
| Formaldehyde HCHO | 70 |

At the end of 10 minutes the ABS plastic panel was removed and was found to be covered with a deposit of metallic copper. Repetition of Example 1 under identical process conditions but omitting any gold trichloride from the sulfuric acid-chromic acid solution failed to produce a copper plated ABS panel.

Example 2

A panel of ABS plastic described above was activated in a bath containing 500 g./l. sulfuric acid $H_2SO_4$, 100 g./l. of chromic acid (as $CrO_3$), and 10 g./l. of silver nitrate $AgNO_3$. The panel was contacted with the activating bath for 25 minutes at about 72° C. The panel was then rinsed in water, and placed in an electroless copper plating bath having a composition as described in Example 1 at ambient room temperature (about 25° C.) for 10 minutes. At the end of this time the plastic was removed and found to be covered with metallic copper. Repetition of this procedure without the addition of silver ions to the sulfuric acid-chromic acid solution did not yield a copper plate on the panel.

Example 3

A panel of glass reinforced dialyl phthalate plastic was immersed in a solution containing 11 g./l. of sodium hydroxide in ethyl alcohol to which 2.2 g./l. of palladium dichloride $PdCl_2$ was added at room temperature (about 25° C.). After approximately 8 minutes, the panel was removed, water rinsed and placed in an electroless copper bath composition described in Example 1. After immersion in the electroless bath for about 10 minutes at room temperature (25° C.) the fiber glass reinforced plastic panel was removed from solution and found to be covered with metallic copper. No plating was observed when the palladium dichloride $PdCl_2$ was omitted from the sodium hydroxide-ethyl alcohol solution.

Example 4

A panel of methyl methacrylate plastic was immersed for about 8 minutes at room temperature (25° C.) in an activated bath containing 11 g./l. of sodium hydroxide NaOH in water to which 2.2 g./l. of palladium dichloride $PdCl_2$ was added. The plastic panel was removed, water rinsed and immersed at room temperature (25° C.) for about ten minutes in an electroless copper bath having a composition as described in Example 1. The methyl methacrylate plastic panel was removed from the electroless copper bath and found to be coated with a deposit of metallic copper. Under the same conditions, but without the use of palladium dichloride, no copper plate was obtained.

Example 5

A panel of polypropylene plastic was immersed for 10 minutes at room temperature (25° C.) in an activating bath consisting of ethyl alcohol containing 1.0 g./l. of silver nitrate $AgNO_3$. The activated polypropylene plastic panel was removed, water rinsed and immersed in an electroless copper plating bath as described in Example 1 for about 10 minutes at room temperature (25° C.). The polypropylene panel was removed from the electroless copper bath and found to be covered with metallic copper. Repetition of the experiment under the same conditions without silver nitrate does not produce a copper plate.

Example 6

A panel of high impact polystyrene plastic was immersed for approximately 10 minutes at room temperature (25° C.) in an activating bath consisting of equal volumes of ethyl alcohol and ethylacetate to which 0.2 g./l. of palladium chloride $PdCl_2$ was added. The activated polystyrene panel was water rinsed and then placed in an electroless copper bath as desicribed in Example 1 for 10 minutes at room temperature (25° C.). After removal from the electroless copper bath, the polystyrene plastic panel was found to be covered with metallic copper.

Example 7

A panel of high impact polystyrene plastic was immersed for 10 minutes at room temperature (25° C.) in acetone to which 1 g./l. of silver nitrate $AgNO_3$ was added. The activated polystyrene plastic panel was removed, water rinsed and immersed in an electroless copper plating bath as described in Example 2 for 10 minutes at 25° C. After removal from the electroless copper bath, the polystyrene plastic panel was found to be covered with metallic copper. Under identical conditions, but without any silver nitrate, no copper plate is obtained.

Example 8

A clean panel (20 x 50 x 0.3 cm.) of ABS plastic was immersed for approximately 18 minutes at 70° C. in a bath containing 500 g./l. of sulfuric acid $H_2SO_4$, 100 g./l. of chromic acid (as $CrO_3$); and approximately 0.1 g./l. of palladium dichloride $PdCl_2$ to produce an activated AMS plastic panel. The activated ABS plastic panel was rinsed and then immersed in an aqueous solution containing 25 g./l. of sodium hypophosphite $NaHPO_2$ for 3 minutes at 70° C. to produce a reduced activated ABS plastic panel. The reduced activated ABS panel was rinsed in water and immersed for about 5 minutes at approximately 70° C. in an electroless nickel plating bath having a pH of approximately 4.2–4.8 consisting of nickel chloride $NiCl_2 \cdot 6H_2O$–50 g./l., sodium citrate dihydrate $NaC_6H_5O_7 \cdot 2H_2O$–10 g./l., and sodium hypophosphite monohydrate $NaH_2PO_2 \cdot H_2O$–10 g./l. The ABS panel was removed and found to be covered with a deposit of metallic nickel. In an alternate example, the activated ABS panel was immersed directly into the electroless nickel bath to produce a deposit of metallic nickel on the ABS plastic panel without contacting the activated ABS panel with the reducing agent (sodium hypophosphite) in a separate step. Repetition of Example 8 under the same conditions, but without palladium dichloride $PdCl_2$, does not produce a nickel plated ABS plastic panel.

Example 9

In a similar manner, a panel of clean ABS plastic was immersed in the activating solution of Example 8 for 7.5 minutes at 72° C. to produce an activated surface on the ABS panel. This activated ABS panel was rinsed in water and then immersed for 3 minutes at 62° C. in a reducing bath containing 10 g./l. of sodium hypophosphite monohydrate $NaH_2PO_2 \cdot H_2O$ to produce a reduced activated ABS panel surface. The reduced-activated ABS panel was then immersed in an electroless nickel bath as described in Example 7 for 10 minutes at 65° C. The ABS plastic panel was removed and found to be covered with a deposit of metallic nickel. The nickel plated ABS plastic panel was rinsed with water and transferred to a standard acidic copper electroplating bath and plated with approximately 50 microns of electrolytic copper. A standard adhesion test gave a value of 2.1 kilograms/cm.; a value of at least 0.75 kilogram/cm. is considered good.

Examples 10–15

Various activating bath compositions, reducing agents, and electroless nickel and copper bath compositions were used to activate and plate ABS panels employing procedures similar to those shown in the preceding examples. The results and conditions are summarized in Table I. In Examples 10–15, activating solution A (described infra) was used.

The following designations are provided for the bath compositions employed in Table I:

ACTIVATING SOLUTION A 100 g./l. chromic acid (as $CrO_3$)
500 g./l. sulfuric acid $H_2SO_4$
0.1 g./l. palladium chloride $PdCl_2$ (in Example 10—0.005 g./l. of $PdCl_2$ was used)
Remainder water

TABLE I.—ETCHING AND ACTIVATING SOLUTION A

| | Immersion bath | | | Immersion reducing bath | | | Immersion | Electroless bath | |
|---|---|---|---|---|---|---|---|---|---|
| Example No. | Time, (min.) | Temp., °C. | Separate reducing agent | Time, (min.) | Temp., °C. | Electroless plating solution | time, (min.) | Temp. °C. | Results |
| 10 | 20 | 71 | None | | | Nickel solution B | 7 | 54 | Adherent nickel plate. |
| 11 | 18 | 71 | do | | | Nickel solution B | 8 | 52 | Do. |
| 12 | 15 | 71 | 35% by weight HCHO in water. | 5 | 65 | Copper solution D | 5 | 22 | Adherent copper plate. |
| 13 | 14 | 71 | 15 g./l. $NaH_2PO_2$· $H_2O$ in water. | 5 | 63 | Nickel solution C | 14 | 63 | Adherent nickel plate which was subsequently electroplated.[1] |
| 14 | 18 | 70 | None | | | Nickel solution C | 10 | 70 | Adherent nickel plate was subsequently electroplated.[2] |
| 15 | 11 | 69 | Dimethylamine borane 0.2 g./l. | 5 | 50 | Nickel solution C | 8 | 69 | Adherent nickel plate. |

NOTE: $\mu$=1 micron; [1] With copper—(19$\mu$, bright nickel (25$\mu$) then chromium plated (0.25$\mu$); [2] With copper (12.5$\mu$) semi-bright nickel (25$\mu$) and bright nickel (10$\mu$) to give a mirror bright decorative nickel deposit.

ELECTROLESS NICKEL SOLUTION B 45 g./l. nickel sulfate hydrate $NiSO_4$·$6H_2O$
45 g./l. lactic acid
1.5 g./l. dimethylamine borane
pH 6.7

ELECTROLESS NICKEL SOLUTION C 50 g./l. nickel chloride hexahydrate $NiCl_2$·$6H_2O$
50 g./l. sodium citrate dihydrate $Na_3C_6H_5O_7$·$2H_2O$
10 g./l. sodium hypophosphite monohydrate $NaH_2PO_2$·$H_2O$
pH 4.5

ELECTROLESS COPPER SOLUTION D 30 g./l. cupric sulfate pentahydrate $CuSO_4$·$5H_2O$
140 g./l. Rochelle salts $KNaC_4H_4O_6$·$4H_2O$
42 g./l. sodium hydroxide NaOH
70 g./l. formaldehyde HCHO
25 g./l. sodium carbonate $Na_2CO_3$

REDUCING AGENTS formaldehyde HCHO
sodium hypophosphite $NaH_2PO_2$·$H_2O$
dimethylamine borane $(CH_2)_2NHBH_3$ Although this invention has been disclosed by reference to various specific examples, it will be apparent to those skilled-in-the-art that various modifications and changes may be made thereto which fall within the scope of this invention.

We claim:
1. A process for preparing an activated polymer surface which consists essentially of contacting a clean nonactive unconditioned polymer surface with a liquid activating composition containing at least one reactive conditioning agent in combination with at least one ion of a metal selected from the group consisting a platinum, palladium, silver, gold, iron, nickel, cobalt, copper, and rhodium, wherein the reactive conditioning agent contains sulfuric acid and chromic acid and wherein the polymer surface contains acrylonitrile-butadiene-styrene terpolymer.

2. A process for preparing an activated polymer surface which consists essentially of contacting a clean, nonactive unconditioned polymer surface with a liquid activating composition containing at least one reactive conditioning agent in combination with at least one ion of a metal selected from the group consisting of platinum, palladium, silver, gold, iron, nickel, cobalt, copper, and rhodium wherein the reactive conditioning agent contains ethyl alcohol.

3. A basis material bearing a polymer surface at least a portion of which has been initially activated with an activating composition containing ethyl alcohol and at least one ion of a metal selected from the group consisting of platinum, palladium, silver, gold, iron, nickel, cobalt, copper and rhodium.

4. A basis material bearing a polymer surface containing acrylonitrile-butadiene-styrene terpolymer wherein at least a portion of said polymer surface has been initially activated with an activating composition containing sulfuric acid and chromic acid in combination with at least one ion of a metal selected from the group consisting of platinum, palladium, silver, gold, iron, nickel, cobalt, copper, and rhodium.

References Cited

UNITED STATES PATENTS

| 3,035,944 | 5/1962 | Sher | 117—47 |
| 3,222,218 | 12/1965 | Beltzer et al. | 117—47 |
| 3,305,460 | 2/1967 | Lacy | 117—47 |
| 3,379,556 | 4/1968 | Chiecchi | 117—47 |

OTHER REFERENCES

"C and EN," pp. 48 and 49, Mar. 25, 1963.

MURRAY KATZ, Primary Examiner

U.S. Cl. X.R.

117—138.8

Notice of Adverse Decision in Interference

In Interference No. 97,890 involving Patent No. 3,561,995, S. H. L. Wu and E. J. Seyb, Jr., METHOD OF ACTIVATING A POLYMER SURFACE AND RESULTANT ARTICLE, final judgment adverse to the patentees was rendered Mar. 21, 1974, as to claims 1 and 4.

[*Official Gazette July 2, 1974.*]